United States Patent [19]

Weber

[11] Patent Number: 4,856,389
[45] Date of Patent: Aug. 15, 1989

[54] DEVICE FOR SETTING FASTENER ELEMENTS AND PINS

[75] Inventor: Karl-Heinz Weber, Wolfratshausen, Fed. Rep. of Germany

[73] Assignee: Weber-Schraubautomaten GmbH & Co., K.G., Wolfratshausen, Fed. Rep. of Germany

[21] Appl. No.: 76,516

[22] Filed: Jul. 22, 1987

[51] Int. Cl.$^4$ ............................................. B25B 7/02
[52] U.S. Cl. ........................................ 81/429; 81/435; 172/2
[58] Field of Search ...................... 81/57, 37, 473, 467, 81/431, 432, 433, 434, 435 XR, 429; 173/2 XR, 11, 12, 20 XR, 15, 4

[56] References Cited

U.S. PATENT DOCUMENTS

| | | | |
|---|---|---|---|
| 2,446,363 | 8/1948 | Daum | 192/48 |
| 2,989,996 | 6/1961 | Dixon | 144/32 |
| 3,387,669 | 6/1968 | Wise et al. | 173/20 |
| 3,642,039 | 2/1972 | McGee | 81/57.37 |
| 4,674,367 | 6/1987 | Aab et al. | 81/57.37 |

FOREIGN PATENT DOCUMENTS 0131851 1/1985 European Pat. Off. .

OTHER PUBLICATIONS

Leaflet: "Weber-Drehuberwachungen fur Kupplung und Motorantrieb", Weber-Schraubautomaten GmbH & Co. (1983).

Primary Examiner—Frederick R. Schmidt
Assistant Examiner—Lawrence Cruz
Attorney, Agent, or Firm—Willian Brinks Olds Hofer Gilson & Lione Ltd.

[57] ABSTRACT

The invention relates to a device for setting fastener elements or pins, particularly to a screw-setting device. The device comprises a housing in which a retainer shaft for a setting tool is mounted at least for axial displacement, at least one advance drive mechanism within the housing and adapted to be connected to the retainer shaft, a switching sleeve mounted for displacement together with the retainer shaft and defining at least one switch-off point, at least one sensor device supported in the housing for defining the switch-off point, and an adjustment mechanism for adjusting the switch-off point. In known devices of this type, the accurate and rapid adjustment of the switch-off point is difficult. According to the invention the adjustment mechanism is provided within the housing between the switching sleeve and the retainer shaft. The retainer shaft additionally or alternatively cooperates with a stop to limit its stroke within the range of the stroke of the advance drive mechanism with the aid of the switching sleeve to thereby prevent the retainer shaft from being advanced excessively beyond the switch-off point in the absence of a fastener element.

28 Claims, 4 Drawing Sheets

DEVICE FOR SETTING FASTENER ELEMENTS AND PINS

FIELD OF THE INVENTION

The invention relates to an improved setting device for the setting of fastener elements, such as screws, and pins.

BACKGROUND OF THE INVENTION

In a setting device disclosed in an advertisement sheet entitled 1.5.8.1 "Telegramm" issued by the applicant in 1983, a feeler assembly is mounted on a plate which is in turn mounted for axial displacement in a housing. The feeler assembly is engaged to the plate and housing by a threaded spindle operable to adjust the axial position of the feeler assembly relative to a retainer shaft and to a switching sleeve to thereby set a switch-off point to the desired screw-tightening depth. The retainer shaft is axially displaceable within the housing. The switching sleeve is axially displaceable relative to the retainer shaft while being movable in unison therewith over a predetermined axial range. The adjustment of the switch-off point by altering the axial position of the feeler assembly is in practice encumbered by difficulty in finding its desired axial position. The adjustment of the switch-off point is thus rather time consuming and troublesome in this known device. Also, the construction of the components for the adjustment of the feeler assembly is rather complicated. In addition, the adjustment assembly comprises outward projecting parts at variance with the desire to provide a compact device having a smooth exterior.

In a screw-driving device of a different type described in U.S. Pat. No. 2,446,363 the biasing nut of a friction clutch threaded on a hollow drive shaft within the housing is adjusted by means of a turning tool engaging the biasing nut through outward opening slots in the housing. The adjustment of the biasing nut merely alters the limit torque of the friction clutch, so that this known device does not in any manner suggest the general principle for an adjustment of the switch-off point.

U.S. Pat. No. 2,989,996 also discloses a screw-driving device of a different type. For retracting the screw-driving tool within the housing a control flange is mounted for displacement in unison with the screw-driving tool. When the preset screw-tightening depth is reached, the control flange cooperates with a crank lever pivotally mounted on the exterior of the housing to actuate a valve for a retraction mechanism. The screw-tightening depth is adjusted by means of an adjustment assembly, again mounted to the exterior of the housing.

OBJECT AND SUMMARY OF THE INVENTION

It is an object of the invention to provide a setting device which permits the switch-off point to be readily and quickly adjusted to the desired screw-tightening depth.

It is a further object of the invention to provide a setting device in which the adjustment assembly is mounted within the housing, resulting in a compact housing and the elimination of outward projecting parts.

According to one embodiment of the invention, a setting device is provided for setting fastener elements, such as screws, and pins, which solves the foregoing problems. A retainer shaft for a setting tool is mounted in the housing and is axially displaceable within the housing. At least one advance drive mechanism adapted to be connected to the retainer shaft is positioned within the housing. A switching sleeve is mounted in the housing and is axially displaceable in an advancing direction in unison with the retainer shaft. The switching sleeve has at least one actuating edge defining a switch-off point within the range of the advance movement of the retainer shaft. A sensor device connected to the drive mechanism and responsive to the actuating edge on the switching sleeve provides means for switching the drive mechanism off when the desired fastener depth or pin depth has been reached. An externally accessible means is provided for adjusting the axial position of the switch-off point relative to the retainer shaft. This adjustment means includes an adjustment mechanism positioned between the retainer shaft and the switching sleeve. The switching sleeve acts as an externally accessible adjusting member for the adjustment mechanism.

In a device of this construction, the double function of the switching sleeve permits the axial position of the retainer shaft relative to the switching sleeve to be adjusted in such a manner that the desired switch-off point is readily, accurately and quickly found. The adjustment is carried out between components participating in the setting movement, the position of the feeler assembly remaining unchanged. Since the actual position of the retainer shaft is, in effect, adjusted relative to the feeler edge, the axial play of the various components formerly hindering the accurate adjustment of the axial position of the feeler assembly is eliminated. In addition, the mounting of the adjustment assembly within the housing results in a compact housing and the elimination of outward projecting parts.

In an advantageous embodiment of the invention, the adjustment of the switch-off point can be carried out by a screw-threading movement. This results in a smooth, accurate adjustment. A stop sleeve is mounted as an additional element between the switching sleeve and the retainer shaft and joined thereto by means of a screw-threaded telescope member. This connection is capable of absorbing relatively high loads. For entraining the switching sleeve the stop sleeve can be provided with a stop bearing engaged by the retainer shaft as it is being extended.

In another advantageous embodiment of the invention, the rotary movement can be facilitated by an axial thrust bearing between the retainer shaft and the stop sleeve. The axial thrust bearing is wear-resistant and capable of absorbing relatively great thrust forces. With this embodiment, easy threading adjustment of the switching sleeve is also facilitated due to the low rotary resistance of the axial thrust bearing.

In another embodiment of the invention, the handling of the device during adjustment of the switch-off point can be simplified by the use of a simple turning tool, for instance an adjusting pin, for turning the switching sleeve. The turning tool is inserted into an exposed insertion opening in the switching sleeve, and used to turn the switching sleeve until the switch-off point has been adjusted to the desired position. The turning tool is only used for this adjustment and is otherwise removed. The turning tool employed for this adjustment may be replaced by an adjustment ring included in the housing and coupled to the switching sleeve for its adjustment. This adjustment ring would always remain on the housing. The adjustment of the switch-off point is preferably carried out with the retainer shaft of the setting device in an advanced axial position. This way there is no axial play between the various components which might otherwise render an accurate adjustment more difficult.

In a preferred embodiment of the invention, a stop member halts the advancing movement of the retainer shaft at a predetermined position in the absence of a fastener element, i.e. a screw, to thereby avoid damage of the setting tool and/or of the workpiece surface. In this embodiment, the retainer shaft is advanced beyond the switch-off point, but is then stopped before the tip of the setting tool could cause any damage. An advantage of this embodiment is that although the switch-off point is adjustable, the axial distance between the switch-off point and the stop member limiting the advancing movement of the retainer shaft remains constant while the axial position of the retainer shaft is adjusted relative to the switch-off point and the stop position.

The stop member does not interfere with the properly executed setting process as long as the setting tool is not advanced dangerously close to the workpiece surface. When the feeler assembly operates properly to switch the driving power off before the setting tool reaches the workpiece surface, the stop member does not come into play.

In a preferred embodiment of the invention, the stop member can be a plastic ring, thereby producing a certain dampening effect to avoid a hard impact as the retainer shaft is being stopped. A plastic ring is also advantageous to the dampening of noise, and offers the further advantage that during adjustment of the switch-off point the rotary resistance of the switching sleeve remains low as it engages the plastic ring with an axial thrust.

Braking elements can be positioned between the switching sleeve and the stop sleeve to ensure that the switching sleeve is not inadvertently and uncontrollably maladjusted during operation due to the vibrations and forces generated within the device. The braking effect of the braking elements comes into play only at certain higher force levels, however, so that adjustment can be accomplished by exerting reasonably reduced forces. The braking elements are preferably accommodated in the stop sleeve, so that their braking effect comes effectively to bear on the mutually engaging threads between the stop sleeve and the switching sleeve.

The stop sleeve can be effectively prevented from rotating by providing it with a hexagonal exterior wall surface.

In another embodiment of the invention, the switching sleeve can be resiliently biased towards a staring position opposite the direction of advancement, to be returned to this position relative to the feeler assembly as the retainer shaft is being retracted in preparation of a setting operation. With this embodiment, the switching sleeve does not have to follow the movement of the retainer shaft over the full stroke thereof.

In another embodiment of the invention, limiting elements can be provided for preventing the switching sleeve from being separated from the stop sleeve by improper operation of the adjustment assembly, and for preventing the switching sleeve from being pushed too far back towards the advance drive mechanism. O-rings can provide a dampening limit stop while simultaneously ensuring that the cooperating elements are not clamped to one another at the respective limit of their relative stroke.

According to another important embodiment of the invention, the housing section containing the retainer shaft, the adjustment assembly and the stop mechanism can be disposed between a hold-down housing section in which, for instance in a screw-driving device, the screws supplied thereto are retained a a preengagement position by the setting tool, and a rear drive housing section containing the advance and rotary drive mechanism. The releasable interconnection of the housing sections permits individual housing sections to be exchanged as needed for repair or modification of the device, and also permits any housing section to be combined with other housing sections serving different functions. For instance, the housing section containing the retainer shaft, the stop mechanism and the adjustment assembly may be combined with housing sections other than the ones described above.

In practice, there is frequently the requirement to operate with at least two different setting depths in sequential operation of the setting device. In a further advantageous embodiment of the invention, this requirement is met by forming the switching sleeve with a second engagement edge for cooperating with a second feeler assembly within the housing. The second feeler assembly is axially adjustable within the housing, permitting the second setting depth to be adjusted relative to the first setting depth.

According to another advantageous embodiment of the invention, this functional requirement is met by a simple construction in which a mounting member of the second feeler assembly is slidably received in an axially extending recess of the housing and adapted to be fixedly secured therein at any position therealong.

For ensuring an accurate sliding displacement of the second feeler assembly, the interior of the housing is provided with an axially extending guide path.

Accordingly to another embodiment of the invention, a clamping mechanism can be provided for fixedly securing the second feeler assembly after adjustment of the second switch-off point.

According to other modified embodiments of the invention, this clamping mechanism may comprise a clamping nut provided on the feeler assembly itself, or an axial threaded spindle which offers the additional advantage of ensuring accurate control of the adjusting displacement of the second feeler assembly.

The subject matter of the invention shall now be described by way of example with reference to the accompanying drawings.

DETAILED DESCRIPTION OF THE PRESENTLY PREFERRED EMBODIMENTS

Figure 1:
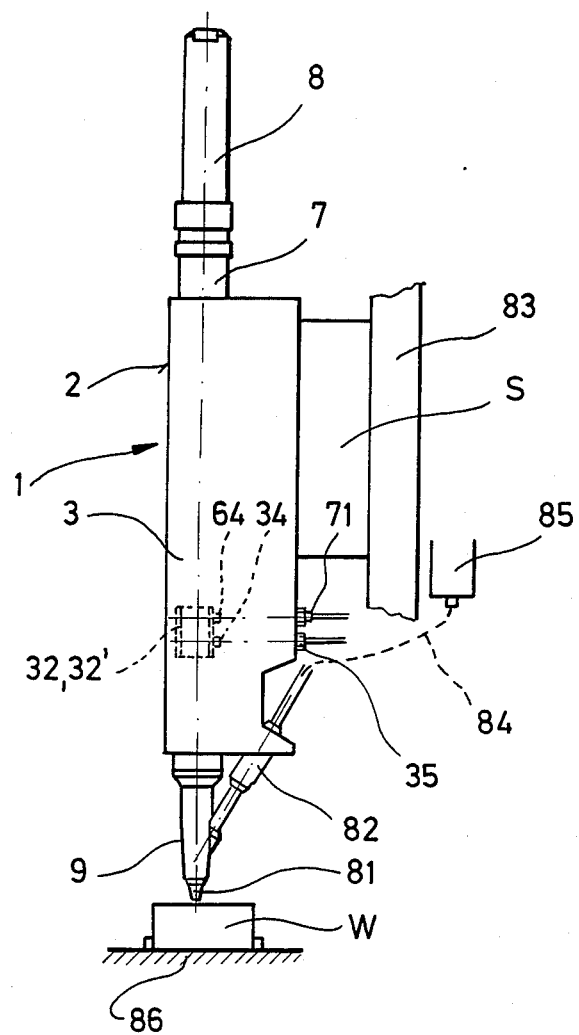
FIG. 1 shows a side view of a device for setting fastener elements.
Figure 2A:
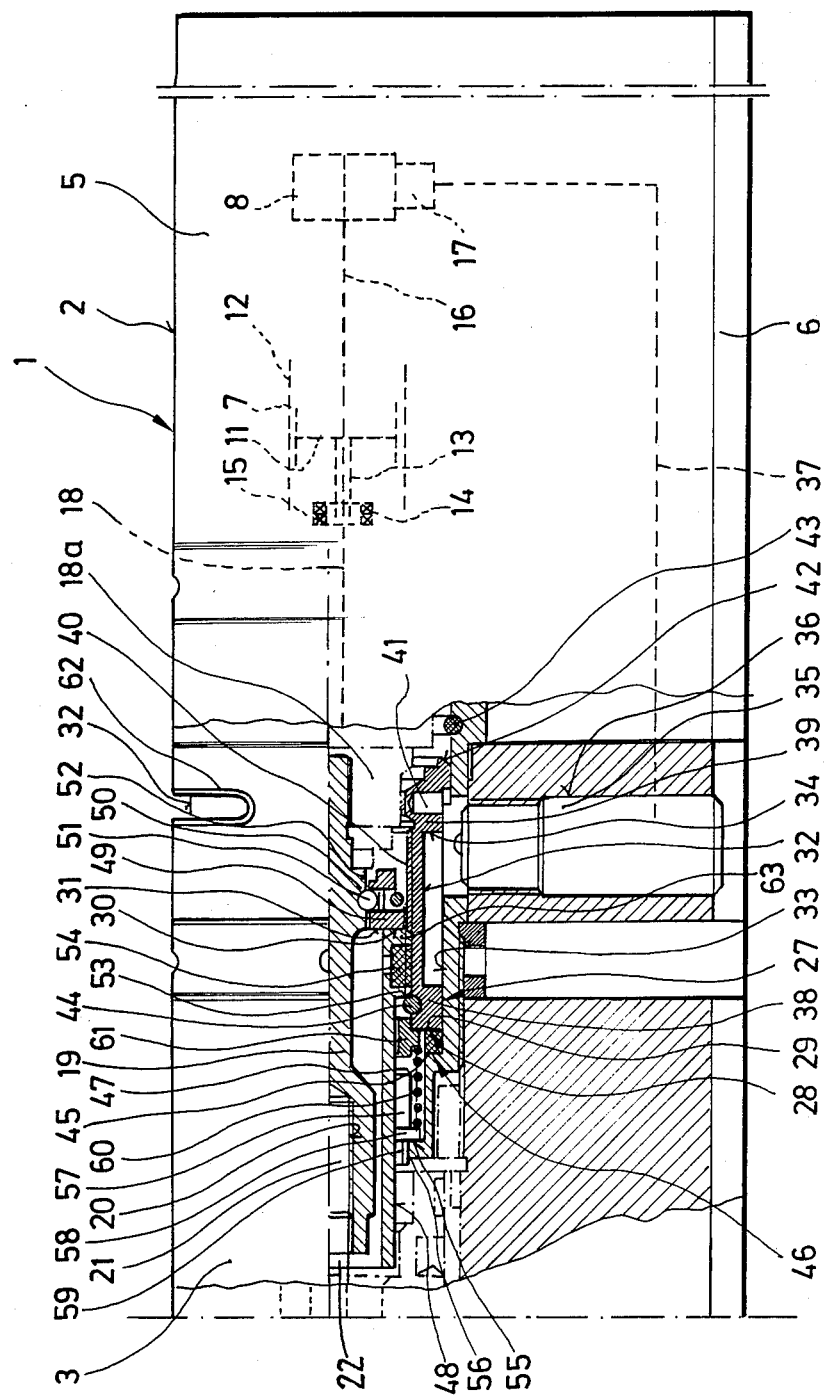
FIG. 2a shows a center portion of the device shown in FIG. 1, partially in longitudinal section.
Figure 2B:
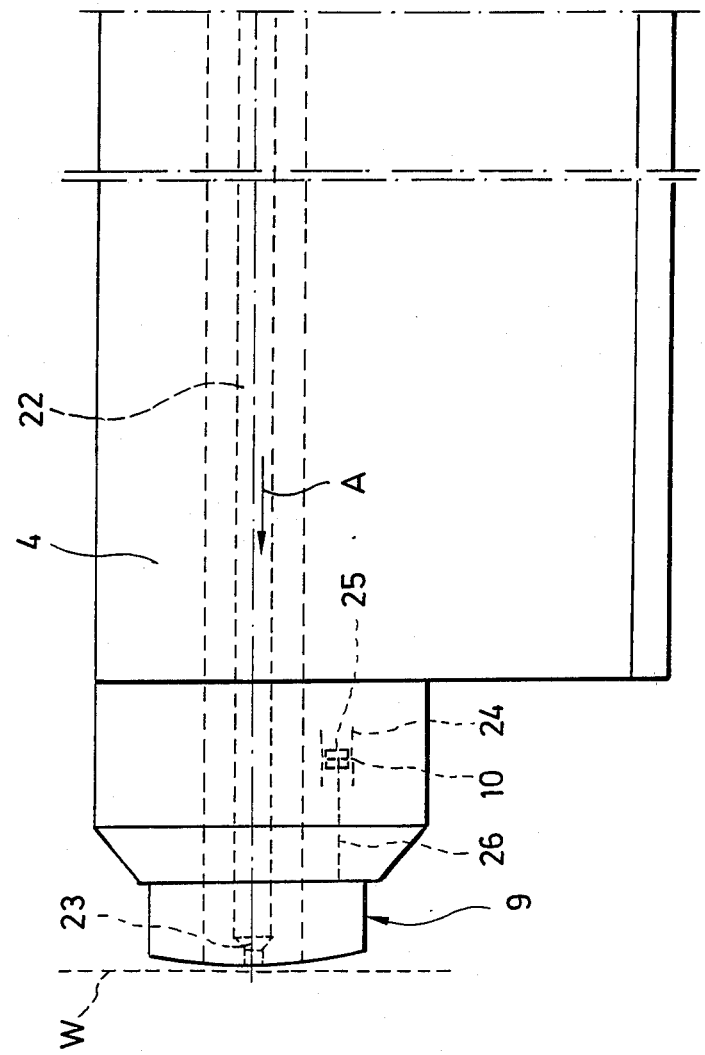
FIG. 2b shows a front section connected to the center section.

A setting device 1 shown in FIG. 1, for instance a screw-driving device, comprises a housing generally indicated at 2 and including a housing center section 3. Device 1 is secured to a stationary support S of a carrying structure 83 for vertical adjustment relative thereto in a manner not shown. During operation of the device housing 2 remains stationary. For securing device 1 to support S the bottom side of housing 2 is formed with a groove 6 as shown in Figs. 2a and 2b. Projecting above the top of housing 2 is an advance drive mechanism 7, and in alignment therewith, a rotary drive mechanism 8 of conventional construction. From the lower end of housing 2 there projects a downholder 9 connected to a feed mechanism 82 to be supplied with fastener elements (not shown) via a feed pipe 84 connected to a supply reservoir 85. Shown at the lower end of downholder 9 is a nozzle member 81 disposed immediately above the surface of a workpiece W which is retained on a support 86 as long as the device is in operation. Diagrammtically shown within housing 2 is a switching sleeve 32 or 32', respectively, formed with two axially spaced engagement edges 34 and 64 for cooperation with feeler assemblies 35 and 71 within housing 2. Feeler assemblies 35 and 71 may be connected either to a central control unit or directly to switch-off mechanisms of drive mechanisms 7 and 8 and adapted to generate a switch-off signal in response to one of engagement edges 34 and 64 reaching a predetermined axial position. During normal operation only one of feeler assemblies 35 and 71 is usually activated and the other is deactivated.

Advance drive mechanism 7 and rotary drive mechanism 8 are accommodated in a rear housing section 5 shown to the right in FIG. 2a. The rotary drive mechanism 8 might also be accommodated in an additional housing section secured to section 5. A forward housing section 4 shown at the left in FIG. 2b carries downholder 9 which is successively fed with the fastener elements to retain them in alignment with a setting tool 22, for instance a screw-driving blade, in preparation of their being threaded into workpiece W. Forward housing section 4 contains a downholder drive mechanism 10. Drive mechanisms 7, 8 and 10 are diagrammatically indicated in FIGS. 1 and 2b. The power supplies for the drive mechanisms and the associated control elements are accommodated at suitable locations within housing 2.

Advance drive mechanism 7 comprises a piston 11 connected to a hollow piston rod 13 and mounted in a cylinder 12. The piston 11 is directed towards housing section 3 for displacement in opposite directions by a pressure medium acting on a respective one of its faces. Diagrammatically shown at the free end of hollow piston rod 13 are claws 14 engaging or adapted to engage complementary claws 15 mounted on an intermediate shaft 18.

Rotary drive mechanism 8 is of conventional construction and can be, for instance, a compressed air motor, a hydraulic motor or an electric motor with or without a transmission gear mechanism. Rotary drive mechanism 8 is provided with an output shaft 16 on which hollow piston rod 13 of advance drive mechanism 7 is slidably mounted. Rotary drive mechanism 8 is also connected to a switch-off mechanism 17. Advance drive mechanism 7 may be switched off together with rotary drive mechanism 8. In a pin-setting device or a press-fitting device the rotary drive mechanism might be eliminated, while in a rivetting device it might be required for the wobbling movement for shaping the rivet head.

Intermediate shaft 18 is provided with a head piece 18a which is threaded into a retainer shaft 19 mounted in housing section 3 for rotation and axial displacement therein. The forward end of retainer shaft 19 is formed with a threaded bore 20 for a threaded end portion 21 of a setting tool 22. The setting tool 22 extends forward into down-holder 9 and carries at its end a tool head, for instance a screw-driving blade 23, selected to fit the type of fastener elements, e.g. screws, to be set.

Downholder drive mechanism 10 comprises a double-acting piston 25 mounted in a cylinder 24 for displacement in opposite directions and connected to downholder 9 through a piston rod 26.

Housing section 3 further houses an adjustment assembly 27 surrounding retainer shaft 19. Also provided are a fixed stop 28 in housing section 3 for cooperation with a counterstop 29, and a counterbearing 30 aligned with a stop face 31.

Counterstop 29 is formed on a front end portion 38 of a switching sleeve 32. The switching sleeve 32 surrounds retainer shaft 19 at a radial spacing and is displaceable in unison therewith in a stepped bore 33 of housing section 3. In the embodiment shown, switching sleeve 32 is provided with an actuating edge 34 for a sensor element 35 mounted in a bore 36 of housing section 3 and connected, as indicated at 37, to at least the switch-off mechanism 17 of rotary drive mechanism 8. Sensor element 35 may be of optical, inductive or mechanic type. Actuating edge 34 defies a switch-off point for the actuation of, for instance, switch-off mechanism 17 of rotary drive mechanism 8 under the control of sensor element 35.

Actuating edge 34 extends outwards from the end portion 39 of switching sleeve 32 opposite its end portion 38. The interior peripheral wall surface of switching sleeve 32 is formed with screw threads 40, preferably fine pitch threads. The outer periphery of end portion 39 is formed with a plurality of circumferentially spaced radial insertion holes 41. End portion 39 terminates outwards with a bevelled edge 42 cooperating with a limiting element 43 within the housing in the form of an O-ring for limiting the displacement of switching sleeve 32 to the right in the figure. A further limiting element 44 in the form of an O-ring is mounted within end portion 38.

Fixed stop 28 is formed by the end face of a plastic ring 45 supported on a shoulder 46 of stepped bore 33 within the housing and is secured thereto, possibly using an adhesive.

Disposed between switching sleeve 32 and retainer shaft 19 is a stop sleeve 47 having a hexagonal outer periphery over the major part of its length.

Figure 3:
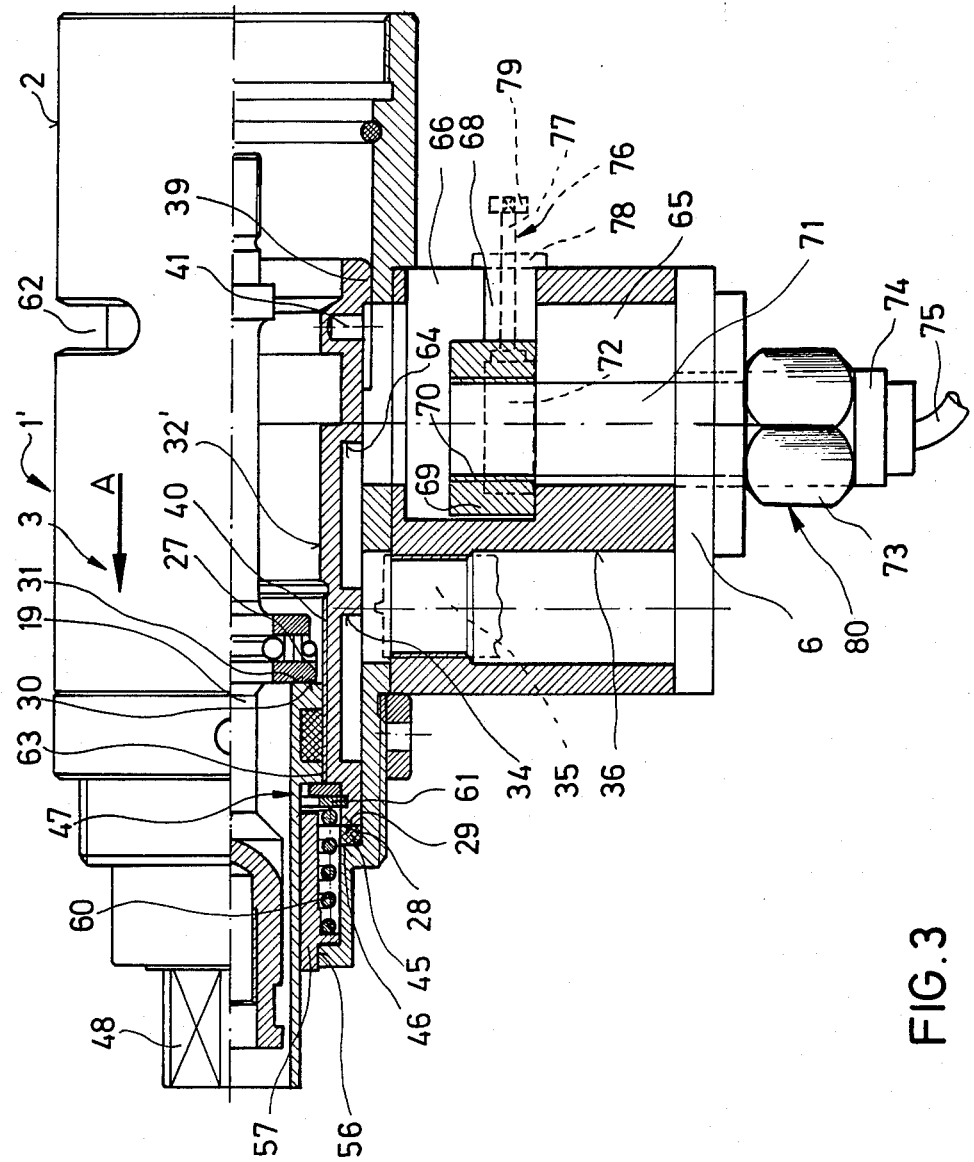
FIG. 3 shows a side view, partially in longitudinal section, of a further embodiment of the invention.

In FIGS. 2a and 3, the housing section 3 has been cut away so as to expose the lower half of the stop sleeve (47) and of the retainer shaft (19). The stop sleeve (47) has an inner diameter which is larger than the outer diameter of the retainer shaft (19), so that the stop sleeve (47) surrounds the retainer shaft (19). Counterbearing 30 is formed by a radial surface on an end portion 53 of stop sleeve 47. The stop surface 31 cooperating with counterbearing 30 is formed by an annular projection member 49 rotatably mounted on a shoulder 52 of retainer shaft 19 by means of an axial thrust bearing 50 having roller members 51. Projection member 49 is effective to ensure that stop sleeve 32 and thus also switching sleeve 32 is entrained by retainer shaft 19 at least over the final stroke of advance drive mechanism 7 in the extending or advance direction A, until the stop is reached.

Circumferentially spaced about end portion 53 of stop sleeve 47 are braking elements 54 preferably in the form of plastic bodies frictionally engaging screw threads 40 of switching sleeve 32. End portion 53 of stop sleeve 47 is formed with interior screw threads 63 engaged with screw threads 40 of switching sleeve 32. Limit stop element 44 cooperates with an inward projecting end portion 39 of switching sleeve 32 for limiting the depth to which stop sleeve 47 may be threaded onto switching sleeve 32.

Disposed in front of housing shoulder 46 is a further inward projecting housing shoulder 55 leading to a passage 56 of hexagonal cross-section. Disposed in passage 56 is a sleeve 57 having a hexagonal outer periphery 59 and resting on a shoulder 58 in the extending or advancing direction (arrow A) of setting tool 22. The other side of annular shoulder 58 supports one end of compressing spring 60, the other end of which is supported on a counterbearing ring 61 seated within end portion 38 of switching sleeve 32. Compression spring 60 acts to bias switching sleeve 32 in the direction towards limit element 43. Housing section 3 is formed with at least one circumferentially extending recess 62 aligned with insertion holes 41 in the adjustment position 32 against stop 28 as shown in the drawing.

The thus described device operates as follows:

In the position shown, device 1 has just finished an operating cycle in which downholder 9 had been supplied with a fastener element, for instance a set screw. Setting tool 22 has been advanced by advance drive mechanism 7 in the advance direction A to the stop position of retainer shaft 19 without encountering a previously supplied set screw and without touching the surface of the workpiece. Advance drive mechanism 7 was switched off when actuating edge 34 passed sensor element 35. Due to the lack of a fastener element advance drive mechanism 7 has moved retainer shaft 19 slightly beyond the switch-off point. In preparation of the next operating cycle piston 11 of advance drive mechanism 7 is moved to the right in the drawing. This causes retainer shaft 19 to be retracted at least to a position in which a new fastener element can be supplied. Compression spring 60 acts to also return switching sleeve 32 and stop sleeve 47 connected thereto until bevelled surface 42 rests on limiting element 43. Under certain circumstances piston 11 of advance drive mechanism 7 may be moved back into its rear end position, in which case claws 14 and 15 may be disengaged from one another.

Assuming that a fastener element again fails to be correctly supplied to downholder 9, the next operating cycle is initiated by actuating advance drive mechanism 7 to advance piston 11 to the left until claws 14 and 15 are again engaged with one another. Rotary drive mechanism 8 is then actuated, so that retainer shaft 19 is rotated and simultaneously advanced towards workpiece W.

This advancing displacement to retainer shaft 19 initially causes stop surface 31 to be engaged with counterbearing 30, whereupon stop sleeve 47 is entrained in unison with switching sleeve 32. Even when actuating edge 34 reaches the relative position within the housing at which sensor element 35 is energized to switch drive mechanisms 7 and 8 off, the unavoidable afterrunning thereof causes retainer shaft 19 to be advanced further towards workpiece W. Before headpiece 23 contacts the surface of workpiece W, counterstop 29 of switching sleeve 32 comes to rest on stop 28 to thereby terminate the advance displacement of retainer shaft 19. This is subsequently followed by the participating components being retracted again.

If for a subsequent operating cycle a fastener element has been correctly supplied to downholder 9, the counterpressure acting on setting tool 22 and thereby also on retainer shaft 19 and piston 11 of advance drive mechanism 7 causes retainer shaft 19 to be immediately stopped as soon as sensor element 35 acts to switch the drive mechanisms off. In this case counterstop 29 may not yet have reaches stop 28, as the latter is only required for stopping retainer shaft 19 when it is permitted to overrun in the absence of a fastener element.

It would also be possible to employ stop 28 for limiting the maximum setting depth. In this case sensor element 35 might be used independently thereof for stopping the drive mechanisms in response to a determined torque indicating the proper tightening of a set screw.

For adjusting the device to different operating conditions or to screws of a different length, adjustment mechanism 27 operates to alter the position of the switch-off point of switching sleeve 32. For this purpose the setting device is brought to the retracted adjustment position, and a turning tool (not shown) is inserted through recess 62 into at least one insertion hole 41 for turning switching sleeve 32 to thereby have retainer shaft 19 to the right or left with the aid of stop sleeve 47. Stop sleeve 47 is non-rotatably and axially displaceably guided in the housing. This operation thus causes retainer shaft 19 to be axially displaced relative to switch-off point 34 and at the same time relative to stop 28. This is facilitated by the fact that stop 28 is formed by plastic ring 45. Plastic ring 45 offers little resistance to the turning movement in the adjustment position, in which all of the components are subjected to a determined axial thrust.

The possible stroke of switching sleeve 32 is limited by stop 28 on one side, and by limiting element 43 on the other. In contrast thereto, the possible stroke of retainer shaft 19 is limited by the position of counterbearing 30 on the one hand and the inwards projecting end portion 39 of switching sleeve 32 on the other. The overall stroke of retainer shaft 19 in housing section 3 is thus defined by the possible stroke of switching sleeve 32 in combination with the possible stroke of axial thrust bearing 50 relative to switching sleeve 32.

The stroke of setting tool 22 in the extending or advance direction A is preferably limited directly by the stop mechanism and is individually adjustable to varying operation conditions without making full use of the structurally determined stroke of piston 11 of advance drive mechanism 7. Damage of the workpiece or the tool and excessive wear of the drive mechanisms are thereby avoided.

The device 1' of FIG. 3 is substantially of the same construction as described with reference to FIGS. 1, 2a and 2b, so that reference may be had thereto. The only difference is that switching sleeve 32' is provided with a second actuating edge 64 spaced rearwards from first actuating edge 34 and cooperating with a second sensor device 71 in housing section 3. Device 1' has thus two switch-off points representing two setting depths or screw-tightening depths for the operation of the device. A master control unit of device 1' (not shown) may be set to selectively respond to the output signal of either of the two sensor devices 34 or 71. Both switch-off points are adjustable in unison by means of adjustment mechanism 27 which in this case is likewise provided between switching sleeve 32' and retainer shaft 19 and adapted to be operated from the exterior through slot 62.

Also provided is the ability to axially adjust the second switch-off point relative to the first switch-off point. To this purpose the second sensor device 71 is mounted in a support member 69 which is guided in an axially extending recess 65 merging into a slot 66 having one open end, and separated therefrom by guide slots 68. Support member 69 is formed with interior screw threads 70 into which second sensor device 71 is threaded so that its end is directed towards second actuating edge 64. Lateral projections 72 of support member 69 are received in guide slots 68 to thereby ensure that second sensor device 71 is guided parallel to the longitudinal axis of device 1' as it is being adjusted.

Second sensor device 71 is adapted to be secured in position within housing section 3 by means of a clamping mechanism 80 comprising a clamp nut 73 threaded onto sensor device 71 and adapted to be screwed down onto the bottom of housing groove 6 to thereby clamp support member 69 in slots 68. An end portion 74 of second sensor device 71 projects through clamp nut 73. A signal transmitting cable 75 extending therefrom leads to the control unit or to the switch-off unit of the drive mechanisms.

Alternatively or additionally there may also be provided a clamping mechanism 76 comprising a threaded spindle 77 having a tool-engagement head 79 and extending parallel to the longitudinal axis of device 1'. Spindle 77 is threaded into a counterbearing 78 of housing section 3 and connected to support member 69. Clamping mechanism 76, which may additionally include a clamp nut for securing threaded spindle 77 in position, is operable in the manner of a micrometer screw to adjust support member 69 over a range defined by the axial length of recess 65.

Device 1' is shown in the so-called adjustment position of its components. Retainer shaft 19 is advanced in the extending direction A to a position in which stop surfaces 31 and 30 contact one another and switching sleeve 32' engages stop 28, so that insertion holes 41 of switching sleeve 32' are accessible through slot 62 for turning switching sleeve 32'. Turning of switching sleeve 32' causes retainer shaft 19 to be displaced to the right or to the left relative to stop 28. In this adjustment position actuating edges 34 and 64 have been displaced to the left to positions beyond their respective switch-off points.

We claim:

1. A setting device for setting fastener elements and pins comprising a housing, a retainer shaft for a setting tool mounted in said housing and axially displaceable within said housing, at least one advance drive mechanism within said housing adapted to be connected to said retainer shaft, a switching sleeve mounted in said housing displaceable in an advancing direction in unison with said retainer shaft and having at least one actuating edge defining a switch-off point within the range of said advance movement of said retainer shaft, means for switching said drive mechanism off comprising a sensor device connected to said drive mechanism responsive to said actuating edge, and externally accessible means for adjusting the axial position of said switch-off point relative to said retainer shaft comprising an adjustment mechanism between said retainer shaft and said switching sleeve wherein said switching sleeve acts as an externally accessible adjusting member of said adjustment mechanism.

2. The setting device of claim 1 comprising a stop sleeve non-rotatably mounted in said housing, surrounding said retainer shaft, and in screw-threaded engagement with said switching sleeve; said retainer shaft having a coupling projection directed toward said stop sleeve for entraining said stop sleeve together with said switching sleeve in said advance direction of movement.

3. The setting device of claim 2 wherein said coupling projection comprises a rotatable, axially fixed annular body of an axial thrust bearing mounted on said retainer shaft.

4. The setting device of claim 3 wherein said stop sleeve comprises a counterbearing directed toward said coupling projection of said retainer shaft in opposition to said advance direction of movement.

5. The setting device of claim 1 wherein said switching sleeve comprises a plurality of circumferentially spaced exterior holes adapted for insertion of a turning tool and wherein said housing comprises at least one circumferentially extending opening which aligns with said insertion holes when said retainer shaft is in an advanced adjustment position.

6. The setting device of claim 1 comprising:
a stop positioned inside said housing for limiting said advance movement of said retainer shaft to an axial stop position; and
means for adjusting said axial stop position of said retainer shaft relative to said stop means;
said adjusting means comprising means for adjusting said axial position of said switch-off point.

7. The setting device of claim 6 wherein said stop means comprises a plastic ring supported on a shoulder of said housing.

8. The setting device of claim 2 comprising circumferentially acting brake elements disposed between said mutually engaging screw threads of said stop sleeve and said switching sleeve.

9. The setting device of claim 8 wherein said circumferentially acting brake elements comprise plastic bodies.

10. The setting device of claim 8 wherein said brake elements are accommodated in said stop sleeve.

11. The setting device of claim 2 wherein said stop sleeve comprises a non-circular outer periphery and is slidably guided in a sleeve having a corresponding interior cross-section and mounted non-rotatably in said housing.

12. The setting device of claim 11 wherein said non-circular outer periphery is hexagonal.

13. The setting device of claim 11 wherein said switching sleeve is supported on a housing shoulder, further comprising a compression spring for biasing said switching sleeve in a direction opposite said direction of advance movement.

14. The setting device of claim 13 comprising a counterbearing ring mounted on said switching sleeve wherein said compression spring is seated in said counterbearing ring.

15. The setting device of claim 14 wherein said compression spring is secured against rotation with respect to said stop sleeve.

16. The device of claim 13 wherein said switching sleeve comprises a first limiting element for limiting the depth of said thread engagement between said switching sleeve and said stop sleeve and wherein said housing comprises a second limiting element for limiting said advance movement of said switching sleeve under the biasing action of said compression spring.

17. The setting device of claim 16 wherein said first limiting element comprises an O-ring.

18. The setting device of claim 16 wherein said second limiting element comprises an O-ring.

19. The setting device of claim 2 wherein said housing comprises at least one housing section exchangeably mounted between further self-contained structural sections of said setting device, and wherein said retainer shaft, said switching sleeve and said stop sleeve are mounted within said housing section.

20. The setting device of claim 19 wherein said self-contained structural sections of said setting device comprise a front downholder housing section and a rear drive mechanism housing section.

21. The setting device of any one of claims 1–14 wherein said switching sleeve comprises first and second actuating edges positioned at a fixed axial distance apart and wherein said housing comprises a second sensor device directed toward the displacement path of said second actuating edge and adapted to be fixed at different adjustable positions axially along said housing.

22. The setting device of claim 21 wherein said second sensor device is retained in a support member adjustably guided in an axially extending recess of said housing.

23. The setting device of claim 22 wherein said housing comprises an axially extending guide path for said support member.

24. The setting device of claim 22 wherein said support member is adapted to be fixedly secured in said recess by a clamping means.

25. The setting device of claim 24 wherein said clamping means comprises a clamping nut threaded onto said second sensor device and adapted to be tightened against said housing.

26. The setting device of claim 24 wherein said clamping means comprises an axially extending threaded spindle engaging said support member and received in threaded engagement in a counterbearing at a fixed position with respect to said housing.

27. A setting device for setting fastener elements and pins comprising a housing including a forward housing section, a center housing section, and a rear housing section; a retainer shaft for a setting tool mounted in said housing and axially displaceable within said housing; at least one advance drive mechanism within said rear housing section adapted to be connected to said retainer shaft; a rotary drive mechanism in alignment with said advance drive mechanism; a downholder within said front housing section adapted to be connected with a feeding means for pins or fasteners; a switching sleeve mounted in said housing displaceable in an advancing direction in unison with said retainer shaft and having at least one actuating edge defining a switch-off point within the range of said advance movement of said retainer shaft; means for comprising said drive mechanism off comprising a sensor device connected to said drive mechanism responsive to said actuating edge; externally accessible means for adjusting the axial position of said switch-off point relative to said retainer shaft comprising an adjustment mechanism between said retainer shaft and said switching sleeve wherein said switching sleeve acts as an externally accessible adjusting member of said adjustment mechanism; a stop sleeve non-rotatably mounted in said housing, surrounding said retainer shaft, and in screw-threaded engagement with said switching sleeve; a plastic ring stop means positioned inside said housing and supported on a shoulder of said housing for limiting advance movement of said retainer shaft to an axial stop position; means for adjusting said axial stop position of said retainer shaft relative to said stop means comprising said adjustment mechanism for adjusting said axial position of said switch-off point; circumferentially acting plastic brake elements accommodated in said stop sleeve and disposed between said mutually engaging screw threads of said stop sleeve and said switching sleeve; said retainer shaft having a coupling projection directed toward said stop sleeve for entraining said stop sleeve together with said switching sleeve in said advance direction of movement, said coupling projection comprising a rotatable, axially fixed annular body of an axial thrust bearing mounted on said retainer shaft; said stop sleeve comprising a counterbearing directed toward said coupling projection of said retainer shaft in opposition to said advance direction of movement and a hexagonal outer periphery slidably guided in a sleeve having a corresponding interior cross-section and mounted non-rotatably in said housing, said mounted sleeve supported on a shoulder of said housing and comprising a compression spring disposed between said mounted sleeve and said switching sleeve biasing said switching sleeve in a direction opposite said direction of advance movement; said switching sleeve comprising a first limiting element for limiting the depth of said thread engagement between said switching sleeve and said stop sleeve; said having comprising a second limiting element for limiting said advance movement of said switching sleeve under the biasing action of said compression spring.

28. The setting device of claim 27 wherein said switching sleeve comprises first and second actuating edges positioned at a fixed axial distance apart and wherein said housing comprises a second sensor device retained in a support member adjustably guided in an axially extending recess of said housing, said support member adapted to be fixedly secured in said recess by a clamping means.

* * * * *

UNITED STATES PATENT AND TRADEMARK OFFICE
CERTIFICATE OF CORRECTION

PATENT NO. : 4,856,389
DATED : August 15, 1989
INVENTOR(S) : Karl-Heinz Weber

It is certified that error appears in the above-identified patent and that said Letters Patent is hereby corrected as shown below:

In column 4, line 6, after "retained" please delete the first occurrence of "a".

In column 5, line 14, please delete "Diagrammtically" and substitute therefor --Diagrammatically--.

In column 8, line 8, please delete "reaches" and substitute therefor --reached--.

Signed and Sealed this

Thirtieth Day of June, 1992

Attest:

DOUGLAS B. COMER

*Attesting Officer*   *Acting Commissioner of Patents and Trademarks*